United States Patent
Hiller et al.

(10) Patent No.: US 10,281,189 B2
(45) Date of Patent: May 7, 2019

(54) COLD ROOM COMBINATION VENT AND LIGHT

(71) Applicant: Kason Industries, Inc., Newnan, GA (US)

(72) Inventors: Raymond J. Hiller, Newnan, GA (US); Brett A. Mitchell, Newnan, GA (US); Burl M. Finkelstein, Newnan, GA (US)

(73) Assignee: Kason Industries, Inc., Newnan, GA (US)

( * ) Notice: Subject to any disclaimer, the term of this patent is extended or adjusted under 35 U.S.C. 154(b) by 143 days.

(21) Appl. No.: 15/190,478

(22) Filed: Jun. 23, 2016

(65) Prior Publication Data

US 2017/0254580 A1    Sep. 7, 2017

Related U.S. Application Data

(63) Continuation-in-part of application No. 15/060,655, filed on Mar. 4, 2016.

(51) Int. Cl.
| | |
|---|---|
| *F16K 15/02* | (2006.01) |
| *F25D 17/04* | (2006.01) |
| *F25D 13/00* | (2006.01) |
| *F25D 27/00* | (2006.01) |
| *F16K 17/04* | (2006.01) |
| *F16K 15/06* | (2006.01) |

(52) U.S. Cl.
CPC .......... *F25D 17/047* (2013.01); *F16K 15/063* (2013.01); *F16K 17/0413* (2013.01); *F25D 13/00* (2013.01); *F25D 17/045* (2013.01); *F25D 27/00* (2013.01)

(58) Field of Classification Search
CPC ...... F25D 27/00; F25D 2327/00; F25D 17/04; F25D 17/047; F25D 17/042; F25D 17/045
USPC ....... 454/293, 322, 248, 294, 295, 274, 283, 454/195, 277, 237, 241; 62/410
See application file for complete search history.

(56) References Cited

U.S. PATENT DOCUMENTS

| | | | |
|---|---|---|---|
| 2,436,183 A | * | 2/1948 | Snedecor ............... B64D 13/02 137/488 |
| 2,991,708 A | | 7/1961 | Falk et al. |
| 3,952,542 A | | 4/1976 | Berkowitz |
| 4,613,930 A | | 9/1986 | Ambasz |
| 4,662,270 A | | 5/1987 | Fiddler et al. |

(Continued)

*Primary Examiner* — Steven B McAllister
*Assistant Examiner* — Ko-Wei Lin
(74) *Attorney, Agent, or Firm* — Baker, Donelson, Bearman, Caldwell & Berkowitz, PC; Dorian Kennedy

(57) ABSTRACT

A combination light and pressure relief vent (10) is disclosed which includes a housing (11), a valve assembly (12), and a light assembly (13). The housing include a valve body (16), port tube (17), and an outside louver (18). The valve body has a low pressure intake port (25), a high pressure intake port (26), and a low pressure exhaust port (27). The valve assembly includes a low pressure intake valve (40), a high pressure intake valve (42), and a low pressure exhaust valve (44). The light assembly includes a heat sink casing (51) which partially defines a heat chamber (52). The casing has a front wall (55) to which is mounted an LED module (57). A lens cover (61) is coupled to the front surface of the casing. Heat generated by the LED module is transferred through the casing to the heat chamber to warm the valve assembly.

22 Claims, 2 Drawing Sheets

(56) References Cited

U.S. PATENT DOCUMENTS

| | | | |
|---|---|---|---|
| 4,817,506 A | | 4/1989 | Cashman |
| 5,421,775 A | * | 6/1995 | Honda ................... B25J 9/103 |
| | | | 454/195 |
| 5,722,181 A | | 3/1998 | Meyer |
| 5,800,261 A | | 9/1998 | Volstad |
| 6,176,776 B1 | | 1/2001 | Finkelstein et al. |
| 6,817,942 B1 | | 11/2004 | Betz |
| 6,875,102 B2 | | 4/2005 | Achen |
| 6,932,694 B2 | | 8/2005 | Jeffries |
| 7,127,855 B1 | | 10/2006 | Garvey |
| 7,651,390 B1 | | 1/2010 | Profeta et al. |
| 7,774,999 B2 | | 8/2010 | McKee et al. |
| 8,574,045 B2 | | 11/2013 | Warner |
| 8,925,262 B2 | | 1/2015 | Railkar et al. |
| 8,991,111 B1 | | 3/2015 | Harkins |
| 8,992,293 B1 | | 3/2015 | Finkelstein |
| 2008/0188173 A1 | * | 8/2008 | Chen ...................... F24F 11/77 |
| | | | 454/239 |
| 2011/0189938 A1 | | 8/2011 | Yoshii et al. |
| 2012/0003917 A1 | * | 1/2012 | Jeong ........................ F24F 3/16 |
| | | | 454/292 |
| 2016/0046164 A1 | * | 2/2016 | Yamamotoya ......... B60G 11/14 |
| | | | 267/286 |

\* cited by examiner

COLD ROOM COMBINATION VENT AND LIGHT

REFERENCE TO RELATED APPLICATION

This is a continuation-in-part of U.S. patent application Ser. No. 15/060,655 filed Mar. 4, 2016.

TECHNICAL FIELD

This invention relates to pressure relief vent used on temperature controlled enclosures such as walk-in freezers and refrigerators.

BACKGROUND OF THE INVENTION

Many temperature controlled commercial enclosed spaces need to be equipped with pressure relief ports or vents which are sometimes referred to as ventilators or ventilator ports. This is particularly true where the sealed space is subjected to temperature related air volume variations that must be relieved.

Cold rooms typically have a neutral air pressure. To achieve the neutral air pressure the cold room is fitted with passive ports or vents. However existing passive pressure relief ports, meaning those without fans or blowers, have often permitted unwanted air migration where there is no significant pressure differential. With walk-in freezers this air intrusion may cause undesirable condensation and frosting. Frosting is a substantial problem that occurs as ambient warm air drawn into a low temperature chamber releases significant amounts of moisture relative to the change in dew point of the air at high and low temperatures. Air is drawn through the port after each door opening cycle as the warm air that entered the enclosure cools and contracts. If venting does not occur, a partial vacuum results within the enclosure which makes it difficult to reopen the door. In extreme cases, the enclosures can even collapse.

A temperature rise in the enclosure between cooling cycles, and especially during a defrost cycle, creates a need to vent air to the exterior to prevent pressure buildup. Again, failure to vent this pressure, with adequate relief capacity, can cause the chamber to rupture.

Passive pressure relief ports are in wide commercial use today. Large structures require the movement of a large amount of air to equalize the pressure between the interior and the exterior of the enclosure. Existing commercial use vents can be either a large sized vent or a gang of small sized vents. This large amount of air movement carries with it a large amount of moisture. This moisture can condense almost immediately upon contact with the cold air and cold surfaces of the enclosure. If this occurs, a large ice block may form on the interior wall, which may eventually block the inflow of air through the port. This large ice block may also pose a potential danger to someone should it fall from the wall. Also, the use of large vents within small rooms causes a low velocity flow of air to enter the room. This low velocity air flow is more susceptible to freezing the moisture within the airflow upon entering the cold room.

Another problem with cold rooms is that high negative pressure may be dangerous as the warm air entering the cold room enters the cold room with the entrance of a person. The entering warm air subsequently cools and creates a negative pressure within the cold room. This negative pressure may hold the door in a closed position until the pressure within the room normalizes. A person within the cold room may become panicked when unable to open the door. Today's vents alleviate small amounts of incoming warm air, but are inadequate to deal quickly with large volumes of warm air associated with multiple door entries or large sliding doors.

Another problem is the icing of certain valves associated with vents of cold rooms. Moisture entering the cold room may condense as ice upon the valves, thereby preventing them from functioning properly. One solution to this problem has been to simply chip the ice off the valve or remove it with the use of a heat gun. These solutions are time consuming and inadequate as it may damage the vent, cause bodily injury, and be only effective once the problem is discovered. As such, some vents have included resistive heaters. However, should the heater fail the problem will go unresolved until the vent heater is repaired.

Yet another problem with some static valves has been that they operate and are adjusted to open at a select pressure gravitationally by adjusting the weight of a movable valve portion (poppet valve), i.e., the valves are gravitationally set and operated by their own weight, as shown in U.S. Pat. No. 6,176,776. However, large air movements, such as wind or even a door closing, may cause the valve to open or flutter. This fluttering of the valve may cause it to open unnecessarily when a need for ventilation does not truly exist. The opening may also cause the valve to remain open for more time than necessary, thereby creating an icing of the valve which increases over time due to the valve remaining in an open condition.

The adjusting of the pressure by having different sized weights also increases costs associated with the vent. The different sizing of components increases the amount of inventory a supplier must carry, increase the number of components required to assemble the vent, and creates a potential for mistakenly utilizing the wrong component.

Accordingly, it is seen that a need exists for a pressure release vent that prevents the formation of ice, is not gravitationally operated, and which allows for different amounts of air flow. It thus is to be provision of such a vent that the present invention is primarily directed

SUMMARY OF THE INVENTION

In a preferred form of the invention a cold room vent comprises a housing mountable to a cold room structure, the housing having a first pressure intake port, a second pressure intake port, and an exhaust port. A first pressure intake valve is mounted to the first pressure intake port and has a first compression spring of a first select size, shape and compression force, and a first spring seat of a first size to create a first spring tension force upon the first pressure intake valve by the first compression spring. A second pressure intake valve mounted to the second pressure intake port and has a second compression spring of a second select size, shape and compression force, and a second spring seat of a second size to create a second spring tension force upon the second pressure intake valve by the second compression spring. The second spring tension force is greater than the first spring tension force. The cold room vent also has an exhaust valve mounted to the exhaust port. With this construction, the first pressure intake valve opens the first pressure intake port at a first air pressure level and the second pressure intake valve opens the second pressure intake port at a second air pressure level.

DETAILED DESCRIPTION

Figure 1:
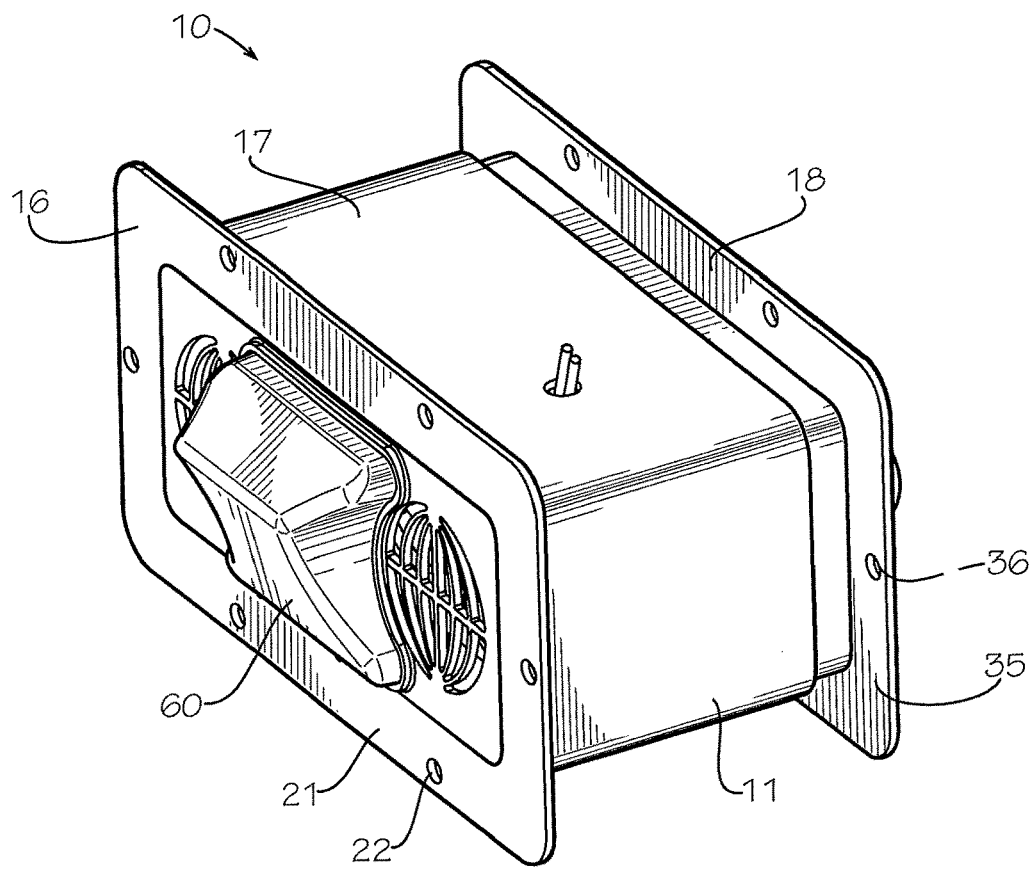
FIG. 1 is a perspective view of a cold room vent and light that embodies principles of the invention in its preferred form.

With reference next to the drawings, there is shown a combination light and pressure relief ventilator or vent 10 in a preferred form of the invention, referred to hereinafter simply as vent. The vent 10 is used with a temperature controlled enclosure, such as a freezer, refrigerator or other cold room, all of which are referred collectively herein as cold room.

The vent 10 includes a housing 11, a valve assembly 12, and a light assembly 13. The housing 11 includes a thermal valve body 16, a tubular port tube 17, and an outside louver 18. The housing 11 is typically mounted to the wall of the cold room with the valve body 16 mounted to the inside surface and the outside louver 18 mounted to the outside surface. The housing 11 is typically made of a plastic material or the like.

The valve body 16 is generally rectangular in shape with a central tube portion 20 and an outwardly extending peripheral mounting flange 21 with flange mounting holes 22 therein through which mounting screws are passed to couple the valve body to the inside surface of the cold room. The valve body 16 has and interior stop wall 24 which has a low pressure intake port 25 therethrough, a high pressure intake port 26 therethrough, and a low pressure exhaust port 27 therethrough. The interior stop wall 24 is positioned inwardly from the front surface 29, including the peripheral mounting flange 21, so as to define an interior chamber 31. Each port 25, 26 and 27 has a central bar 32 with a valve mounting hole 33 therein.

The valve body central tube portion 20 is configured to telescopically mate with port tube 17 which extends through the interior of the cold room walls. The port tube is telescopically coupled at an opposite end to the outside louver 18.

The outside louver 18 has an outwardly extending mounting flange 35 with mounting holes 36 therein through which mounting screws extend to couple the louver 18 to the outside surface of the cold room. The louver 18 includes a drip deflecting hood 37 and a screen 38 therein to prevent the entrance of dirt, foreign object, insects or other pests.

The valve assembly 12 is coupled to and may be considered to be a portion of the valve body 16. The valve assembly 12 includes a low pressure intake valve 40 having a mounting stem 41 extending through the valve mounting hole 33 of the low pressure intake port 25, a high pressure intake valve 42 having a mounting stem 43 extending through the valve mounting hole 33 of the high pressure intake port 26, and a low pressure exhaust valve 44 having a mounting stem 45 extending through the valve mounting hole 33 of the low pressure exhaust port 27. Valves 40, 42 and 44 are all considered to be air flow control valves and all include, in addition to the stem, a conventional configuration with a head. The end of the stem of each valve 40, 42 and 44 is coupled to a spring 47, washer 48 and push in stud 49 which bias each valve towards a closed position. Each spring 47 resides within a spring seat or pocket 50 which holds the spring in place and is part of the central bar 32. Each spring 47 is configured to allow the valve to move from a closed position to an open position against the biasing force or tension of the spring 47, as explained in more detail hereinafter. Each combination valve, valve mounting stem, spring, seat should be consider a valve assembly or valve sub-assembly. As used herein, the term spring tension is intended to denote the biasing force of the spring upon the valve while mounted or assembled in a static pressure condition and is not intended to denote the quantitative biasing force of the spring itself.

Figure 3:
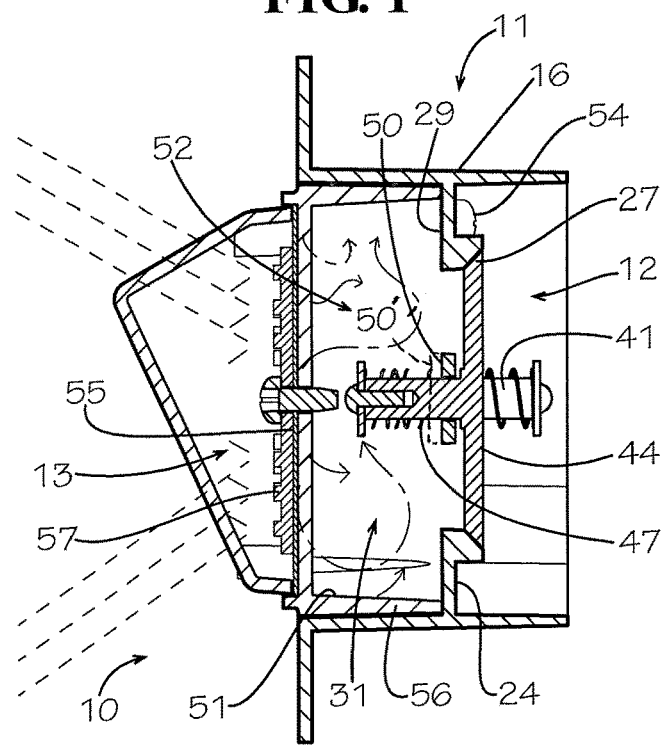
FIG. 3 is a cross-sectional view of the cold room vent and light of FIG. 1.
Figure 2:
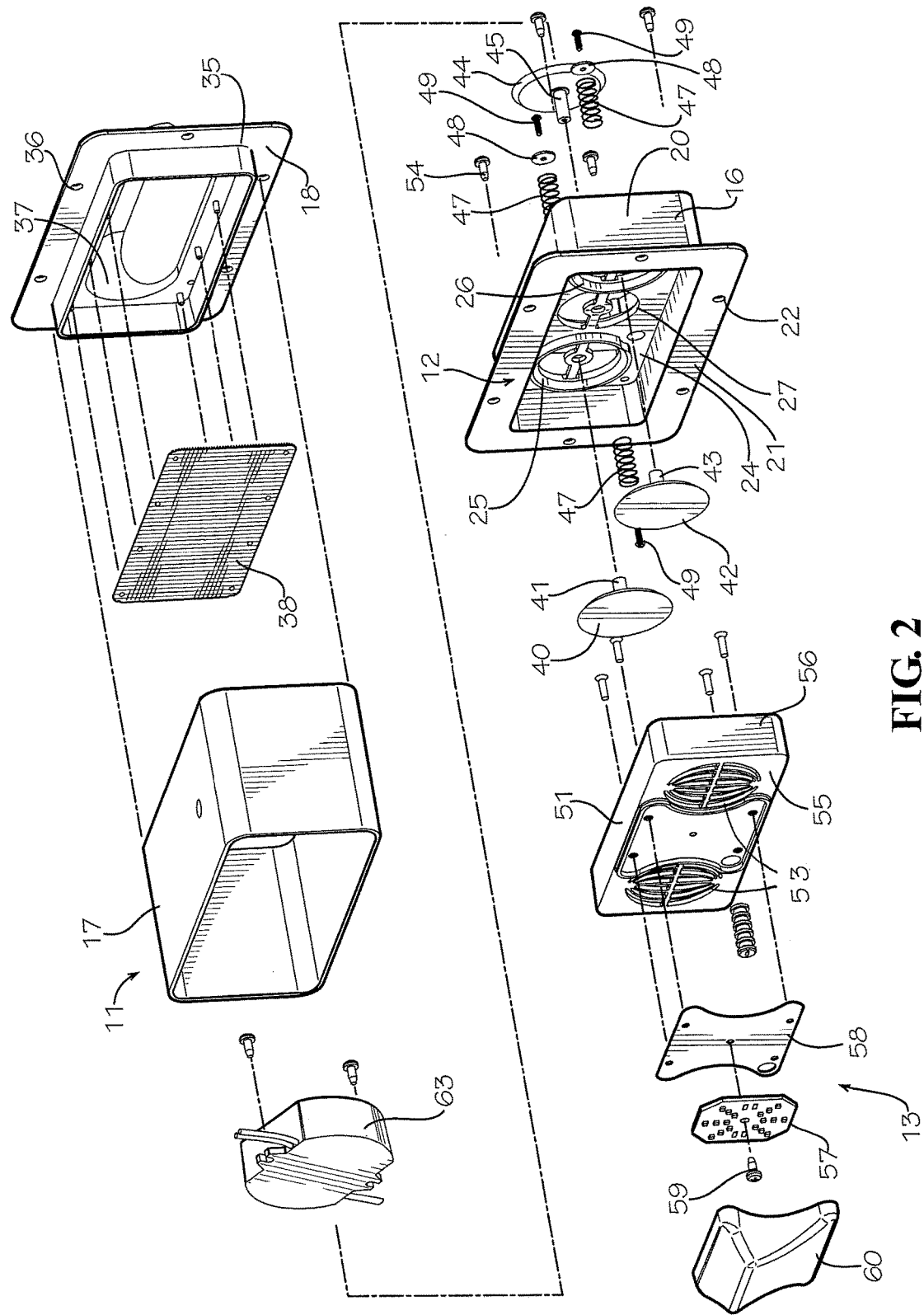
FIG. 2 is an exploded, perspective view of the cold room vent and light of FIG. 1.

The low pressure intake valve 40 and the high pressure intake valve 42 each have the same size and configuration. However, the valve mounting hole pocket or seat 50 of the low pressure intake valve 40 is configured to be deeper than the pocket or seat 50', or positioned farther from the end of the stem, of the high pressure intake valve 42 so that the associated spring 47 of the low pressure intake valve 40 is less compressed than that of the high pressure intake valve, i.e., the high pressure intake valve seat 50' may be thicker than or offset from the low pressure intake valve seat 50, as shown in phantom lines in FIG. 3, to compress the spring 47 between the seat and the washer 48 to a larger degree. This difference in spring compressions or tensions allows the valves 40 and 42 to be the same construction to aid in manufacturing, inventory and installation, yet allows for different opening pressures for each, i.e., the low pressure intake valve 40 opens first due to the spring compression or tension being less than that of the high pressure intake valve 42.

The light assembly 13 includes a rectangular box shaped LED heat sink casing 51 which is configured to telescopically fit within the interior chamber 31 of the valve body 16, so as to enclose and thereby form a heat chamber 52 through the combination of the casing 51 and valve body 16. The casing is preferably made of a heat conductive metal, such as aluminum. The casing 51 is maintained in position by casing mounting screws 54. The casing 51 has a front wall or surface 55, to which is mounted an LED module 57 containing a plurality of LED diodes 58, and four peripheral sidewalls 56. The front wall or surface 55 includes two air passages 53 therethrough. A combination lens gasket and LED thermally conductive pad 58 is position between the LED module 57 and the front surface 55 of the casing 51. The LED module and pad are held in position through a mounting screw 59. A transparent or translucent lens or lens cover 61 is coupled to the front surface 55 of the casing to cover the LED module 57 through lens cover mounting screws 61. An LED driver 63 is electrically coupled to the LED module 57. The LED driver 63 is positioned within the housing 11 and coupled to a source of electric current, such as a conventional A.C. line.

In use, the vent 10 is mounted to the wall of a cold room with the valve body mounted to the interior surface and the outside louver mounted to the exterior surface of the cold room wall. The vent 10 allows for an asymmetrical (flow volume of air in one direction is different from the flow volume of air in the opposite direction), dual stage venting of pressure within the cold room. Should the cold room door be opened and a small amount of air is introduced into the cold room (small volume), the low pressure intake valve 40 overcomes the biasing force of its spring 47 to move to an open position allowing air through the low pressure port 25 and through casing air passages 53 into the room. The opening of the low pressure intake valve 40 allows the entrance, flow, or passage of a small volume of air into the cold room to offset the condensing of the small volume of warm air which creates a negative pressure. The low pressure intake valve 40 commences opening at a negative pressure level of at least or approximately 0.4 inches of water. The valve allows a flow rate of 10 CFM at 0.5 inches of water.

Should the cold room door be opened and a large amount of air is introduced into the cold room (high volume), both the low pressure intake valve 40 and the high pressure intake valve 42 sequentially overcome the biasing forces of their springs 47 to each move to their open positions allowing the flow of air therethrough and subsequently through casing air passages 53. The opening of both the low pressure intake valve 40 and the high pressure intake valve 42 allows the entrance or passage of a large volume of air into the cold room in a very fast manner to offset the condensing of the large volume of warm air which creates a large negative pressure. The high pressure intake valve 42 may be thought of as a second stage valve when a large amount of air is needed to be taken in to relieve the pressure within the cold room. The process commences with the low pressure intake valve 40 opening as previously described. With the high volume of air, the high pressure intake valve 42 then commences opening at a negative pressure level of at least or approximately 0.7 inches of water. The high pressure intake valve allows a flow rate of 30 CFM at 1.0 inches of water. The quick equalization of the pressure through the opening of both valves prevents the cold room door from being stuck closed due to negative pressure within the cold room, which minimizes the potential of one panicking due to the inability to temporarily open the door.

As the room equalizes from the experience of the high negative pressure, the high pressure intake valve 42 will first return to its seated position once the air pressure returns to a level below approximately 0.7 inches of water. The air pressure within the cold room continues to drop by air passing through the low pressure intake valve 40, until the pressure reaches approximately 0.4 inches of water wherein the low pressure intake valve 40 will also move to its closed position. The end results is a cold room which is generally at a neutral pressure after the entrance of a large volume of warm air and its subsequent condensing upon cooling.

The exhaust valve 44 overcomes the biasing force of its spring 47 when positive pressure exists within the cold room. The exhaust valve 44 opens at a positive pressure level of at least or approximately 0.6 inches of water. The exhaust valve allows a flow rate of 10 CFM at 0.5 inches of water. The cold room may experience positive pressure when one slams a door shut or when the air therein warms, such as when the cold room is going through a defrost mode. This positive pressure may prevent the full closing of the refrigerator door.

Thus, the flow or venting of air into the cold room is controlled by at least two intake valves while the flow of air out of the cold room is controlled by a single exhaust valve, all valves being the same size. This arrangement provides for an asymmetric flow of air into the cold room which is approximately twice the amount as the flow out of the cold room. Of course, the number of valves or their sizes may also be different so long as the valve controlled flow into the cold room is much greater than the valve controlled flow out of the cold room. Thus, the select number of intake ports and corresponding valves may be two or more, while the select number of exhaust ports and corresponding valves may be at least one. Preferably, there are twice as many intake ports and valves than there are exhaust ports and valves.

The vent is preferably designed so that the LED module 57 is always energized to provide constant light within the cold room. The use of LED lights facilitates this due to their low power consumption. The heat generated by the constantly illuminated LED module 57 thermally passes through the thermal pad 58 to the LED heat sink casing 51, i.e., the LED module is in thermal communication with the LED heat sink casing 51. This heating of the LED heat sink casing 51 constantly warms the air within the interior chamber 31 of the valve body 16 and thus warms the intake valves 40 and 42 and exhaust valve 44. The warming of the valves prevents the formation of ice upon the valves which would prevent them from properly opening or closing, i.e., prevents the valves from freezing in place within their respective ports. It should be noted that this heating is economical as the cold room should be constantly illuminated regardless.

It should be understood that the combination of a light and vent also reduces cost and labor as both features are achieved through the mounting of a single unit which includes both functions.

It should be understood that the difference in spring compressions may also be achieved through the use of different sized springs, different valve stem lengths, the addition of a spacer to compress the spring, washers 48 of different sizes or thicknesses, or any other method of achieving different compression forces associated with the springs. However, these alternatives are not ideal as they require the stocking and use of different sized components. The different spring compressions results in valves opening at different pressures without having different valve components, thereby reducing costs and inventory requirements.

It thus is seen that a vent is now provided which avoids the formation of ice on the vent valves and allows for both small and large amounts of air venting. Though it has been described in detail in its preferred form, it should be realized that many modifications, additions and deletions may be made without departure from the spirit and scope of the invention as set forth in the following claims.

The invention claimed is:

1. A cold room vent for controlling the venting of air between the interior of a cold room structure and the exterior of a cold room structure, the cold room vent comprising:
   a housing mountable to a cold room structure, said housing having a valve stop wall with a first pressure intake port, a second pressure intake port, and an exhaust port;
   a spring loaded first pressure intake one way valve mounted to said first pressure intake port having a first spring tension which allows the opening of said spring loaded first pressure intake one way valve at a first air pressure level to allow the flow of air in a first direction through said cold room vent from the exterior of the cold room structure to the interior of the cold room structure and prevent the flow of air in a second direction opposite said first direction through said cold room vent from the interior of the cold room structure to the exterior of the cold room structure;
   a spring loaded second pressure intake one way valve mounted to said second pressure intake port having a second spring tension which allows the opening of said spring loaded second pressure intake one way valve at a second air pressure level greater than said first air pressure level to allow the flow of air in said first direction through said cold room vent from the exterior of the cold room structure to the interior of the cold room structure and prevent the flow of air in said second direction opposite said first direction through said cold room vent from the interior of the cold room structure to the exterior of the cold room structure, and
   an exhaust one way valve mounted to said exhaust port to allow the flow of air in said second direction through said cold room vent from the interior of the cold room structure to the exterior of the cold room structure and prevent the flow of air in said first direction opposite said second direction through said cold room vent from the exterior of the cold room structure to the interior of the cold room structure, whereby the spring loaded first pressure intake one way valve opens the first pressure intake port at a first air pressure level and the spring loaded second pressure intake one way valve opens the second pressure intake port at a second air pressure level.

2. The cold room vent of claim 1 wherein said spring loaded first pressure intake one way valve opens upon the cold room structure reaching an air pressure level of at least 0.4 inches of water.

3. The cold room vent of claim 2 wherein said spring loaded second pressure intake one way valve opens upon the cold room structure reaching an air pressure level of at least 0.7 inches of water.

4. The cold room vent of claim 1 wherein said spring loaded second pressure intake one way valve opens upon the cold room structure reaching an air pressure level of at least 0.7 inches of water.

5. The cold room vent of claim 1 wherein said spring loaded first pressure intake one way valve has the same size and configuration as said spring loaded second pressure intake one way valve.

6. The cold room vent of claim 1 wherein said exhaust one way valve is mounted upon said valve stop wall between said spring loaded first pressure intake one way valve and said spring loaded second pressure intake one way valve.

7. The cold room vent of claim 1 wherein said first low pressure intake port has a first spring seat of a first selected size and said second low pressure intake port has a second spring seat of a second select size different from said first select size.

8. A cold room vent for controlling the venting of air between the interior of a cold room structure and the exterior of a cold room structure, the cold room vent comprising:

a housing mountable to a cold room structure, said housing having a valve stop wall with a first pressure intake port, a second pressure intake port, and an exhaust port;

a first pressure intake one way valve assembly mounted to said first pressure intake port to allow the flow of air in a first direction through said cold room vent from the exterior of the cold room structure to the interior of the cold room structure and prevent the flow of air in a second direction through said cold room vent from the interior of the cold room structure to the exterior of the cold room structure, said first pressure intake one way valve assembly having a first pressure intake valve, said first pressure intake valve assembly having a first compression spring of a first select size, shape and compression force, said first pressure intake valve assembly also having a first spring seat of a first size to create a first spring tension force upon said first pressure intake valve by said first compression spring;

a second pressure intake one way valve assembly mounted to said second pressure intake port to allow the flow of air in said first direction through said cold room vent from the exterior of the cold room structure to the interior of the cold room structure and prevent the flow of air in said second direction through said cold room vent from the interior of the cold room structure to the exterior of the cold room structure, said second pressure intake valve assembly having a second pressure intake valve, said second pressure intake valve assembly having a second compression spring of a second select size, shape and compression force, said second pressure intake valve assembly also having a second spring seat of a second size to create a second spring tension force upon said second pressure intake valve by said second compression spring, said second spring tension force being greater than said first spring tension force, and an exhaust one way valve mounted to said exhaust port to allow the flow of air in said second direction through said cold room vent from the interior of the cold room structure to the exterior of the cold room structure and prevent the flow of air in said first direction through said cold room vent from the exterior of the cold room structure to the interior of the cold room structure, whereby the first pressure intake valve assembly opens the first pressure intake port at a first air pressure level and the second pressure intake valve assembly opens the second pressure intake port at a second air pressure level.

9. The cold room vent of claim 8 wherein said first pressure intake one way valve assembly opens upon the ambient air pressure reaching at least 0.4 inches of water.

10. The cold room vent of claim 9 wherein said second pressure intake one way valve assembly opens upon the ambient air pressure reaching at least 0.7 inches of water.

11. The cold room vent of claim 8 wherein said second pressure intake one way valve assembly opens upon the ambient air pressure reaching at least 0.7 inches of water.

12. The cold room vent of claim 8 wherein said first compression spring and said second compression spring are of the same size and configuration, wherein said first pressure intake valve and said second pressure intake valve are of the same size and configuration, and wherein said first spring seat and said second spring seat are of different sizes or configuration resulting in different compressions of said first and second compression springs.

13. The cold room vent of claim 8 wherein said exhaust one way valve is mounted upon said valve stop wall between said first pressure intake one way valve and said second pressure intake one way valve.

14. A cold room vent for controlling the venting of air between the interior of a cold room structure and the exterior of a cold room structure, the cold room vent comprising:

a housing mountable to a cold room structure, said housing having a valve stop wall;

a select number of air pressure intake one way valve assemblies coupled to said housing valve stop wall to allow the flow of air through said cold room vent in an air intake direction from the exterior of the cold room structure to the interior of the cold room structure and prevent the flow of air through aid cold room vent in an air exhaust direction from the interior of the cold room structure to the exterior of the cold room structure, said select number of air pressure intake one way valve assemblies being at least two, and a select number of exhaust one way valve assemblies coupled to said housing valve stop wall to allow the flow of air through said cold room vent in said air exhaust direction from the exterior of the cold room structure to the interior of the cold room structure and prevent the flow of air through said cold room vent in said air intake direction from the exterior of the cold room structure to the interior of the cold room structure, said select number of exhaust one way valve assemblies being at least one, said select number of air pressure intake one way valve assemblies being greater than said select number of exhaust one way valve assemblies,
wherein said exhaust one way valve is mounted upon said valve stop wall between said at least two air pressure intake one way valve assemblies.

15. The cold room vent of claim 14 wherein said select number of air pressure intake one way valve assemblies comprises at least one spring loaded first pressure intake valve assembly and at least one spring loaded second pressure intake valve assembly which opens at a different air pressure level than said first pressure intake valve assembly.

16. The cold room vent of claim 15 wherein said at least one spring loaded first pressure intake one way valve assembly includes a first spring tension which allows the opening of said spring loaded first pressure intake one way valve assembly at a first air pressure level, and wherein said at least one spring loaded second pressure intake one way valve assembly includes a second spring tension which allows the opening of said spring loaded second pressure intake one way valve assembly at a second air pressure level greater than said first air pressure level.

17. The vent of claim 15 wherein said spring loaded first pressure intake one way valve opens upon the cold room structure reaching an air pressure level of at least 0. 4 inches of water.

18. The cold room vent of claim 17 wherein said spring loaded second pressure intake one way valve opens upon the cold room structure reaching an air pressure level of at least 0.7 inches of water.

19. The cold room vent of claim 15 wherein said spring loaded second pressure intake one way valve opens upon the cold room structure reaching an air pressure level of at least 0.7 inches of water.

20. The cold room vent of claim 15 wherein said spring loaded first pressure intake one way valve assembly has the same size and configuration as said spring loaded second pressure intake one way valve assembly.

21. The cold room vent of claim 15 wherein said select number of exhaust one way valve assemblies is positioned between said at least one spring loaded first pressure intake one way valve assembly and said at least one spring loaded second pressure intake one way valve assembly.

22. The cold room vent of claim 15 wherein said select number of exhaust one way valve assemblies, said at least one spring loaded first pressure intake one way valve assembly and said at least one spring loaded second pressure intake one way valve assembly are all of the same size and configuration.

* * * * *